G. G. DONALDSON.
ROPE PULLEY.
APPLICATION FILED OCT. 13, 1909.
956,051.
Patented Apr. 26, 1910.
2 SHEETS—SHEET 2.
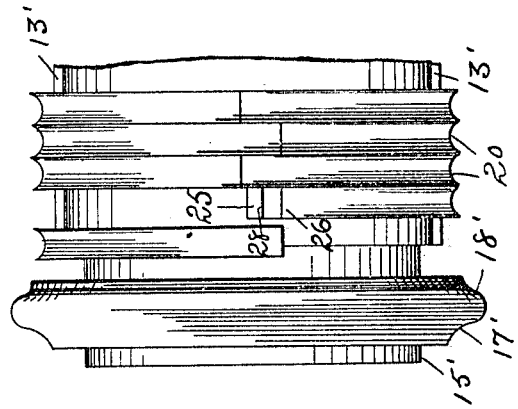
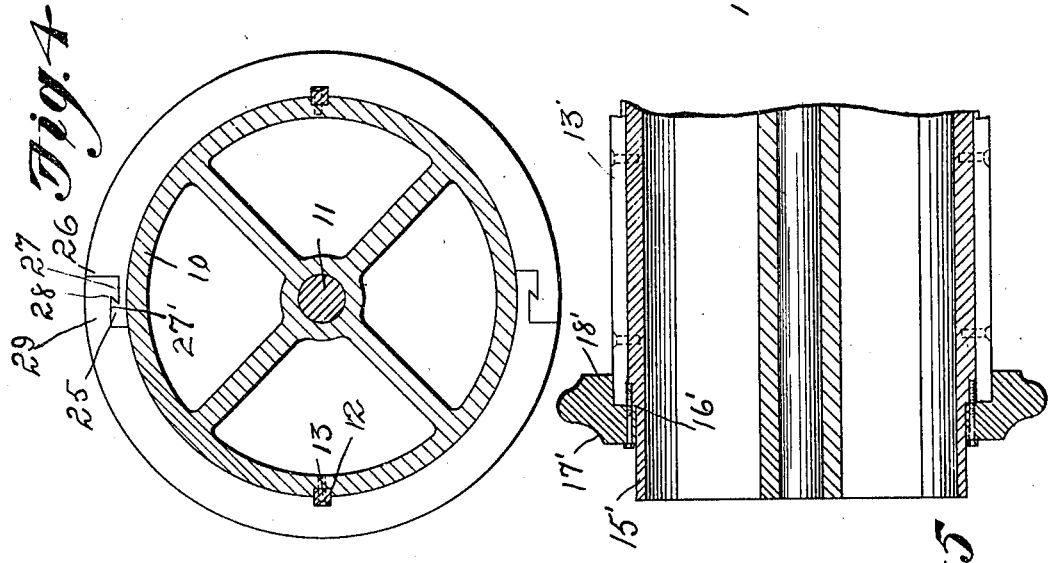
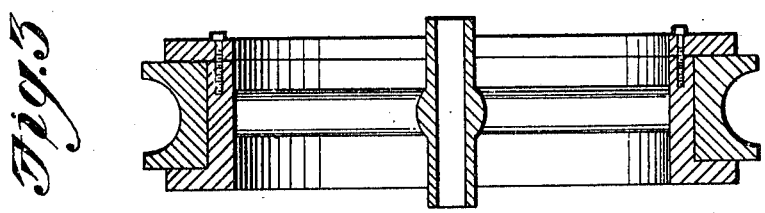
Witnesses
Inventor
G. G. Donaldson
By Woodward & Chandler
Attorney

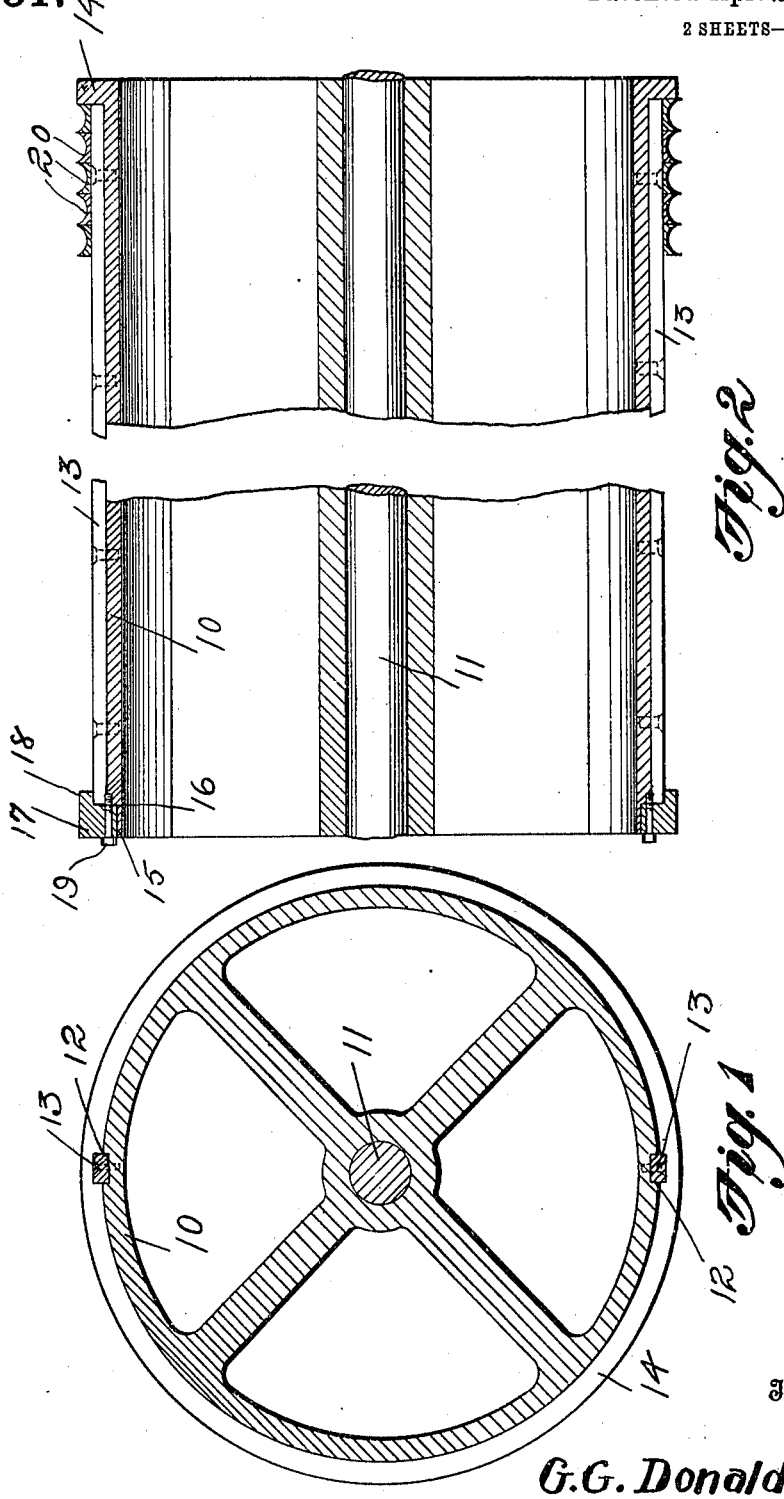

UNITED STATES PATENT OFFICE.

GEORGE G. DONALDSON, OF REPUBLIC, MICHIGAN, ASSIGNOR OF ONE-HALF TO CHARLIE A. PALO, OF REPUBLIC, MICHIGAN.

ROPE-PULLEY.

956,051.  Specification of Letters Patent.  Patented Apr. 26, 1910.

Application filed October 13, 1909. Serial No. 522,381.

*To all whom it may concern:*

Be it known that I, GEORGE G. DONALDSON, a citizen of the United States, residing at Republic, in the county of Marquette and State of Michigan, have invented certain new and useful Improvements in Rope-Pulleys, of which the following is a specification.

This invention relates to pulleys, and more particularly to that type provided with grooves for carrying a rope.

An important object of the invention is to provide such a pulley having grooved rings carried detachably thereon to provide an easily renewable bearing surface for cables and the like.

Another object is to provide a novel means for securing the rings upon the central portion of the device.

Another object is to provide such a device, the bearing portions of which may be very quickly removed and renewed.

Other objects and advantages will be apparent from the following description, and it will be understood that changes in the specific structure shown and described may be made within the scope of the claims without departing from the spirit of the invention.

In the drawings forming a portion of this specification, and in which like numerals of reference indicate similar parts in the several views, Figure 1 is a cross sectional view of the drum, Fig. 2 is a longitudinal sectional view thereof showing the retaining ring and a plurality of bearing rings in place, Fig. 3 is a similar view of a modification in which there is but one bearing surface which is renewable, Fig. 4 is a cross sectional view of a further modification, Fig. 5 is a fragmentary longitudinal sectional view of this modification, Fig. 6 is an elevational view thereof, showing one of the bearing rings in semi-detached position. Fig. 7 is a sectional view of a modified form of the groove members.

Referring to the drawings, there is shown a central drum member 10 carried upon a suitable shaft 11, the drum being provided with two longitudinally extending key-ways 12 on opposite sides, in which there is secured the key member 13 extending throughout its length, the drum having at one end an integral annular retaining flange 14, and at its opposite end being provided with a reduced longitudinally extending portion 15 providing a shoulder 16. The key 13 extends flush with the outer side of the shoulder, and engaged over the reduced portion 15, there is an annular retaining flange or collar 17 provided with the inwardly projecting flange 18 arranged to engage snugly over the peripheral face of the drum, and having opposed notches therein arranged to receive the outer ends of the key 13. The collar 17 is provided with a plurality of openings extending longitudinally with respect to the drum, and formed in the shoulder 16, there are a plurality of registering threaded recesses in which are engaged headed bolts 19 which hold the collar 17 snugly in operative position. It will be noted that the key member 13 is comparatively broad and is secured in the slots or grooves 12 by means of suitable screws which are engaged in countersunk passages formed in the key. Longitudinally slidable upon the drum, there are disposed a plurality of annular groove-bearing members 20 which are provided with oppositely disposed notches arranged to engage snugly over the key member 13.

In order to renew one of the rings 20, the retaining collar 17 is removed by the loosening of the bolts 19, and the necessary number of rings 20 slipped over the end of the drum to allow removal of the ring which it is desired to replace. This ring is slipped from the drum and a new one introduced in its place, after which the remaining rings are returned to their position and the collar 17 again secured in place.

In similar devices of this kind, it has been customary to secure the retaining collar in place by a large number of bolts, and in operation the retaining flange is subjected to somewhat of a rotary strain by engagement either with adjacent rings, or by a cable carried in an adjacent ring, which at times tends to shear the bolts, necessitating the use of a large number of such fastening means. In the present device, by the provision of the inwardly projecting portion 18 having the notches engaging with the key of the drum, it is necessary to use but a very small number of securing bolts, any rotative tendency of the flange being resisted by the key.

In Fig. 3 there is illustrated a simple form of device in which but one grooved ring is employed, providing a very simple pulley wheel of a durable character.

In Figs. 4 to 6 inclusive, there is shown a further modification of the device in which the rings are adapted to be removed from the drum without entire displacement of any of the rings. This form of the device includes a drum of similar construction to that first mentioned, with the exception that the reduced extension 15' equivalent to that 15 of the first form is considerably longer, and the flanged portion 18' should project inwardly over the peripheral part of the drum for a somewhat greater distance. The drum is provided with a shoulder 16' inwardly of the reduced portion 15', and the key member 13' extends flush with the shoulder as shown. The flanged portion 18' is carried by the retaining collar 17' which is secured to the drum in a manner similar to that described in the first form. The rings in this form of the device are formed in two sections which may be as nearly semi-circular as desirable, and are provided with central notches on their inner sides arranged to engage snugly over the key 13'. One end portion of each section is cut away on its upper or outer side to provide the interior tongue 25, and shoulder portion 26. A transverse recess 27 is formed across the inner end of the tongue 25 adjacent the shoulder 26, the outer side of the recess, or that adjacent the extremity of the section being undercut as shown at 28. The opposite end of each section is cut away on its under or inner side, to form the superior tongue 29 having a similar transverse recess 27' similar to that first described, the outer side of which is similarly undercut. By the formation of the recesses in this manner, an approximately hook-shaped head is formed at each extremity of the sections, the head on one section being adapted to engage snugly in the recess of another section when introduced laterally thereinto to form a continuous annulus. By this construction, when it is desired to remove one of the rings, it is simply necessary to loosen the securing bolts in the retaining member 17' and slide it outwardly on the reduced portion 15' a distance equal to the width of one of the rings. The rings outwardly of that which it is desired to remove, are then moved toward the end of the drum, sufficiently to allow the displacement of one-half of the ring to be removed from the plane of the other half as shown in Fig. 6 when each section may be readily removed from the drum. By this construction an enormous saving in the time required in renewing the rings is saved, and the expense of maintenance thus further reduced.

What is claimed is:

1. A device of the class described comprising a supporting drum member having longitudinally extending keys thereon, sectional surface members longitudinally movable upon the drum, said surface members being provided with notches engaged snugly upon the keys to prevent relative rotation of the drum and surface portions, said drum having a peripherally reduced extremity forming a shoulder, said key portions extending flush with the shoulder, and an annular retaining member engaged slidably over the reduced portion and projecting over the periphery of the drum, and having notches engaged snugly with the key portions, said retaining member being adapted to be compressed against the rings, and means for securing the retaining member upon the drum.

2. A device of the class described comprising in combination a drum member having longitudinally extending key portions thereon, a plurality of annular grooved sectionalized bearing members slidingly carried thereon, each of said members comprising oppositely disposed semicircular sections, one end portion of each section being cut away on its outer side and provided with an undercut inwardly extending shoulder, the opposite end of each section being cut away on its under side and provided with a similar shoulder adapted to be laterally introduced into engagement with the similar shoulder of an opposite section to allow similar disengagement of the sections for lateral disengagement of the bearing members from the drum, and means for retaining said bearing members against longitudinal movement upon the drum, and engaging with one end of the key portions.

In testimony whereof I affix my signature, in presence of two witnesses.

GEORGE G. DONALDSON.

Witnesses:
 JOHN W. DONALDSON,
 HORACE H. LOVELAND.